United States Patent [19]

Hunter

[11] 3,841,158

[45] Oct. 15, 1974

[54] DIFFERENTIAL PRESSURE TRANSMITTER OVERRANGE PROTECTION

[75] Inventor: Richard C. Hunter, Willoughby, Ohio

[73] Assignee: Bailey Meter Company, Wickliffe, Ohio

[22] Filed: June 18, 1973

[21] Appl. No.: 371,321

Related U.S. Application Data

[62] Division of Ser. No. 214,677, Jan. 3, 1972, Pat. No. 3,756,085.

[52] U.S. Cl............................. 73/407 R, 73/398 AR
[51] Int. Cl................................................ G01i 7/08
[58] Field of Search....... 73/407 R, 398 R, 88.58 D, 73/398 AR; 92/15; 116/DIG. 42

[56] References Cited
UNITED STATES PATENTS
3,187,711   6/1965   Campolong................. 116/DIG. 42

FOREIGN PATENTS OR APPLICATIONS
895,748   5/1962   Great Britain............... 116/DIG. 42

Primary Examiner—Donald O. Woodiel
Attorney, Agent, or Firm—J. M. Maguire

[57] ABSTRACT

A fluid-filled differential pressure transmitter using sensing diaphragms and a pressure sensitive transducer as the sensing element. The transducer is protected from overrange pressure damage by an easily deflected bellows. A break-away coupler maintains the bellows substantially rigid during normal pressure ranges and becomes disengaged during an overrange pressure condition to allow the bellows to easily deflect and accommodate the excess fluid displaced by the high pressure sensing diaphragm without excessive increase in the pressure sensed by the transducer.

6 Claims, 9 Drawing Figures

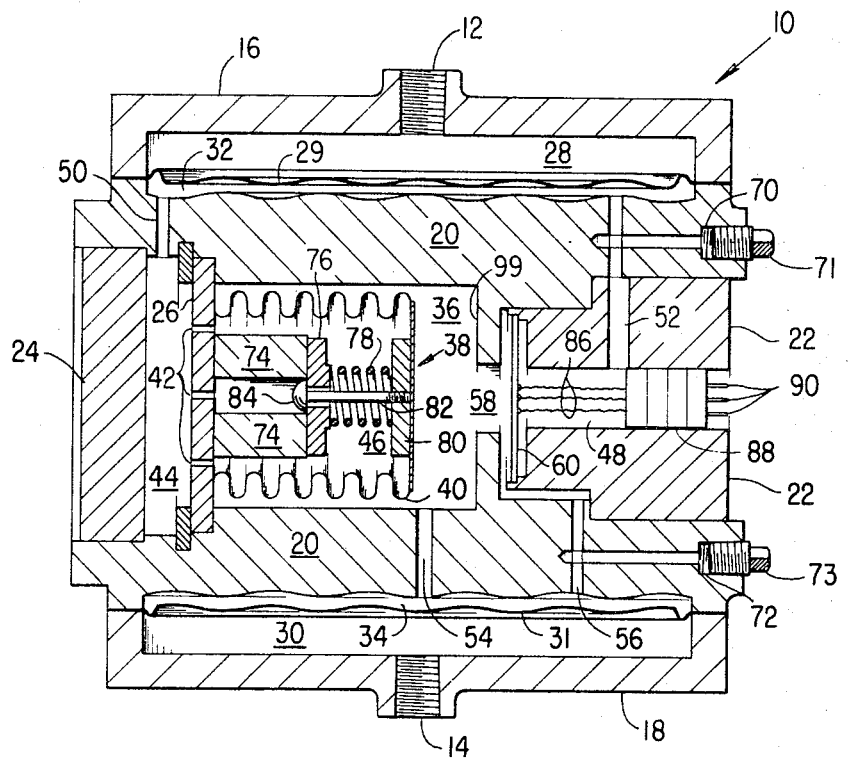
Fig. 1
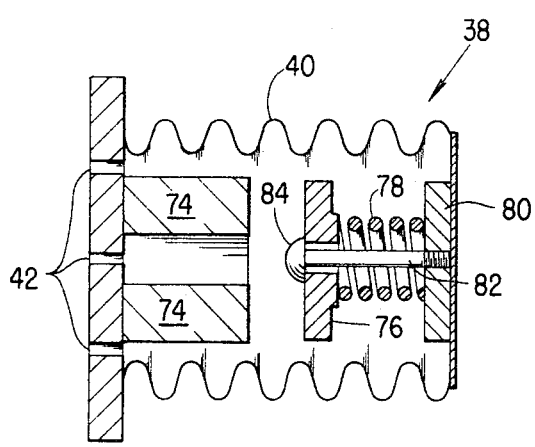
Fig. 1b
Fig. 1a 3,841,158

DIFFERENTIAL PRESSURE TRANSMITTER OVERRANGE PROTECTION

This is a division of application Ser. No. 214,677, filed Jan. 3, 1972, now U.S. Pat. No. 3,756,085.

BACKGROUND OF THE INVENTION

1. Field of the Invention

The present invention relates generally to pressure measuring devices and more particularly to such devices which use differential pressure transducers easily damaged by overrange pressure conditions.

The invention is particularly applicable for use in transmitters having no moving parts and depending upon conversion of a sensed pressure to an electrical signal. The invention is described with particular reference to differential pressure transmitters but it will be appreciated that the invention has broader applications such as in any type of pressure transmitter.

2. Description of the Prior Art

Differential pressure transmitters have heretofore depended upon the motion of a sensing element to provide a pressure indication. A bellows was allowed to expand and contract in response to a pressure differential. This bellows motion was transmitted by mechanical linkage to provide an indication of the pressure differential sensed.

Overrange protection was provided by the bellows sealing its pressure inlet lines at some predetermined maximum deflection. As with all devices depending upon moving parts for their function, these transmitters were subject to inaccuracy and component wear. The overpressure seals were subject to leakage and proved ineffective during extended periods of overrange pressure being applied to them.

The refinement of solid state pressure sensors allowed the development of differential pressure transmitters which require no moving parts to provide pressure indication. These transmitters provide an output signal which is a function of the stress induced in a transducer by the applied pressures. Any deflection of the transducer due to this stressing is minimal and, due to the transducer's small size, the displaced volume is also near negligible. Furthermore these transducers are relatively fragile and are easily damaged by the application of excess pressures. These factors require the transducer not only to be reliably protected from overrange pressures but deny the use of any overrange protection device dependent upon sensor motion.

Another common means of providing overrange protection in prior art devices has been the placing of back-up stops near the sensor to limit its deflection. This method, although acceptable for the motion type transducers, is not applicable to solid state transducers. The near negligible deflection of the transducer in solid state transmitters makes impossible the placement of stops within the required tolerances.

Motion transmitters employing an intermediate pressure sensing fluid also provided over range protection by stop plates for the diaphragms that transfer the input pressure from the process to the intermediate fluid. This protection resulted from using sensing bellows which nested into a backplate or into each other at some maximum pressure thereby preventing further pressure transfer. Again because of the negligible volume displacment of the transducer in solid state transmitters, tolerance on the location of such stops makes this approach impractical.

SUMMARY OF THE INVENTION

In accordance with the present invention, there is provided a solid state differential pressure transmitter which allows a first and second pressure signal to be transferred to a pressure transducer which provides a proportional signal output. The first and second pressure signal are isolated from each other by isolating means which include an easily deflected bellows and means for maintaining it substantially rigid up to a predetermined pressure difference. Beyond this pressure difference the means keeping the bellows rigid becomes disengaged and the bellows becomes free to deflect. By deflecting, the bellows changes volume to compensate for the increased pressure sensed and thereby prevents transducer damage from overrange pressures.

Further in accordance with the invention, magnetic means is used to maintain the bellows rigid up to a predetermined pressure beyond which the bellows is free to expand. Magnetic coupling is set up by a magnet and its strike plate. The magnet is located on the bellows and the strike plate is maintained stationary or vice versa. The force of this magnetic coupling is predetermined to prevent the bellows from deflecting until the application of overrange pressure conditions. Once the overrange condition is approached, the magnetic coupling is broken and the bellows is free to deflect to prevent further pressure buildup by changing volume. The magnet and its strike plate are arranged to act either upon bellows expansion or compression or in both directions. Similarly the magnet and its strike plate are either located outside or inside of the bellows.

Further in accordance with the invention, a mechanical means is alternatively used to maintain the bellows rigid during normal range pressures. A rod rigidly connected to the bellows is maintained stationary by a spring loaded ball which fits into an indent in the rod. The spring loading is adjusted to allow the ball to slide out of the indent when a force is applied to the rod by an overpressure condition on the rigidly connected bellows. Once the ball is free of the indent, the bellows is free to deflect and change volume relieving any further pressure transferred to the bellows.

Further in accordance with the invention, another means is used to maintain the bellows structure rigid up to a predetermined pressure beyond which the bellows expands to prevent transducer damage. This protection is accomplished by properly chosen spring means for substantially preventing bellows deflection during the normal range of measured pressures. The bellows expands in response to overrange pressure until the space between a transfer diaphragm and its back plate is evacuated. The bellows deflection and resulting volume increase to accommodate this displaced fluid is predetermined to occur within an overpressure range which will not damage the transducer. Further increase in process pressure will not be transferred to the transfer bellows due to the transfer diaphragm resting against its back plate.

The invention solves the previously mentioned problems of working with very small distance or volume tolerances by providing magnetic and mechanical means which are easily adjusted to disengage upon preset overpressure conditions to allow volume changes to occur through the deflecton of a bellows. This deflection prevents further overrange pressures from being transferred to the sensing transducer and damaging the transducer.

The main object of the invention is to provide a solid state transmitter which has no moving parts during normal pressure ranges but protects its transducer during overrange pressure conditions from pressures which would damage it.

Another object of the invention is to provide an overpressure protection device which is maintained rigid up to a preset pressure and is free to change in volume beyond that pressure to prevent further pressure buildup.

BRIEF DESCRIPTION OF THE DRAWINGS

FIG. 1 is a cross-sectional view of a differential pressure transmitter with a separately located transducer sensor and magnetic overrange protection coupler.

FIG. 1a is a cross-sectional expanded view of the magnetic coupler of FIG. 1 shown coupled and preventing bellows expansion.

FIG. 1b is a cross-sectional expanded view of the magnetic coupler shown de-coupled during overrange pressure.

DESCRIPTION OF THE PREFERRED EMBODIMENTS

Figure 2A:
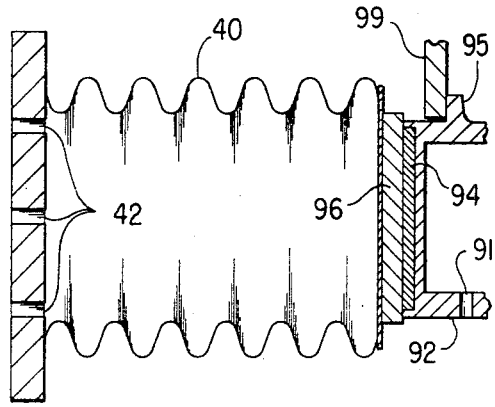
FIG. 2a is a cross-sectional view of another magnetic coupler shown coupled and preventing bellows contraction.

Referring now to the drawings wherein the showings are for purposes of illustrating the preferred embodiments of the invention and not for the purposes of limiting same, a differential pressure transmitter assembly 10 has symmetrical inlet housings 16 and 18. At one end of each housing 16, 18 there is a threaded process pressure inlet 12 and 14 respectively. The threaded inlet 12 leads to high pressure process fluid chamber 28 comprised of the rigid inside wall of housing 16 and a sensing diaphragm 29 which can be deflected by the process fluid pressure even to a point where the diaphragm 29 nests or presses up against an internal partition 20. Similarly the threaded inlet 14 leads to a low pressure process fluid chamber 30 comprised of the rigid inside wall of housing 18 and a sensing diaphragm 31 which may be deflected by the process fluid pressure even to a point where the diaphragm 31 nests or presses up against the internal partition 20. The space between the sensing diaphragm 29 and the partition 20 comprises a high pressure sensing chamber 32 which is filled with an incompressible fluid such as silicon oil. Similarly the space between the sensing diaphragm 31 and the partition 20 comprises a low pressure sensing chamber 34 which also is filled with an incompressible fluid such as silicon oil.

The internal partition 20 has a cavity which forms a bellows chamber 36 in communication with a low pressure detecting chamber 58. An overpressure assembly 38 is located in the bellows chamber 36. The assembly 38 is affixed to a bellows mounting wall 26. An access wall 24, when removed, allows the overpressure assembly 38 to be checked and replaced when necessary. Between the access wall 24 and mounting wall 26 is formed a high pressure chamber 44 which communicates by way of passages 42 with a bellows cavity 46 formed by the assembly 38. The assembly 38 is comprised of a bellows 40 on the end of which there is affixed a threaded plate 80 retaining a rod 82 having an enlarged head 84. A magnet strike plate 74 is affixed to the wall 26. A permanent magnet 76 is magnetically coupled to the strike plate 74 by a light spring 78. The rod 82 extends through a hole in the magnet 76 which is larger than the rod 82 but smaller than the rod head 84. Opposite the access wall 24 a transducer mounting insert 22 is sealably inserted into the internal partition 20. A high pressure detection chamber 48 is formed within the insert 22, on the inside end of which is sealably mounted a transducer 60 so as to have its one face at high pressure and its other face at low pressure. Connecting wires 86 extend from the transducer to a terminal block 88 having plug terminals 90. This wiring arrangement provides protection for the fragile wires 86 as well as a speedy connection of the transmitter output signal to any suitable converting and/or readout device.

The high pressure sensing chamber 32, fluid chamber 44, bellows cavity 46 and detecting chamber 48 are all filled with an incompressible fluid through a sensing fluid fill port 70. A passage 52 communicates the fluid from the port 70 to the detecting chamber 48 as well as to the sensing chamber 32. A passage 50 further communicates the fluid from chamber 32 to chamber 44 from which multiple passages 42 through wall 26 communicate it to the bellows cavity 46. The low pressure sensing chamber 34, bellows chamber 36, and detecting chamber 58 are also filled with an incompressible fluid but through a fill port 72. The port 72 communicates the fluid to the sensing chamber 34 and detecting chamber 58 through a passage 56. The sensing chamber 34 communicates the fluid to the bellows chamber 36 through a passage 54. When all the high and low pressure chambers are filled, the ports 70, 72 are selaed with plugs 71, 73 respectively.

The transmitter 10 as described is intended for use, typically, to measure a small pressure difference of the magnitude of 7 or 8 lbs. between fluids having absolute pressure values in the range of 1,500 lbs. A typical measurement situation may be a pressure drop across an in-line orifice (not shown) to determine the flow in a high pressure line. For such a situation, a pressure tap upstream of the orifice is taken and connected to the threaded inlet 12. Similarly a pressure tap downstream of the orifice is taken and connected to the threaded inlet 14. The fluid from these upstream and downstream taps fill the high pressure fluid chamber 28 and low pressure fluid chamber 34 respectively, pressurizing both chambers. The upstream pressure in chamber 28 is sensed by the diaphragm 29 and transmitted by the incompressible fluid in chamber 32 to detecting chamber 48 by passage 52, where it is detected by the high pressure face of transducer 60. The downstream pressure in chamber 30 is sensed by the diaphragm 31 and transmitted by the incompressible fluid in chamber 34 to the low pressure detecting chamber 58 by the passage 56, where it is detected by the low pressure face of transducer 60. The pressure difference across the transducer 60 stresses it causing it to transmit an electrical output signal along wires 86 to the connecting terminals 90 to which an appropriately calibrated readout device is coupled.

The transducer 60 may be of the type described in U.S. Pat. application Ser. No. 22,977, "Silicon Pressure Transducer Circuit," by J. C. Martin et al. By its nature, this type of a transducer is fragile and requires that it be stressed near its endurance limit by the detection pressure range to provide an accurate and sensitive output signal over that measured range. For these reasons overrange pressure protection becomes extremely important.

Overrange protection is provided by the overpressure assembly 38. The bellows 40 has its cavity filled with incompressible fluid which transmits the upstream pressure sensed by the diaphragm 29. The bellows chamber is filled with fluid which transmits the downstream pressure sensed by the diaphragm 31. Thus the same pressure difference appearing across the transducer 60 also appears across the bellows 40. As long as this pressure difference is within the measuring range of the transducer 60, bellows 40 expansion is prevented by the force of the magnet 76 coupled to the strike plate 74 preventing the rod head 84 from moving. Since the rod 82 connects the face of bellows 40 to the magnetic couple, there is no change in volume on either the high or low pressure side, and the actual upstream and downstream pressures are transmitted to the transducer 60.

To understand more clearly the function of the assembly 38 during overrange pressure conditions now refer to FIGS. 1a and 1b. As shown in FIG. 1a, the magnetic coupling between magnet 76 and plate 74 is predetermined to remain intact through the transducer 60 normal measuring range of pressure differences also being applied across the bellows 40. Should the upstream pressure rise to a point where the difference is greater than the normal measuring range, the magnetic coupling is broken and the bellows is subjected only to a negligible restoring force from the spring force of the bellows 40 and is free to increase in volume rather than be subjected to the greater pressure difference.

FIG. 1b shows the bellows 40 in an expanded overpressure condition. Extreme overpressure situations, as the application of full line pressure to the bellows cavity, are also protected. The chamber 32 in FIG. 1, under such a condition, would be completely evacuated of fluid by the diaphragm 29 bottoming or nesting with the partition 20 at a predetermined pressure, and the displaced fluid accomodated by the increased volume of the bellows 40. Once this occurs, any further increase in pressure is not transmitted to either the bellows 40 or the transducer 60 but is absorbed by the partition 20. This predetermined pressure limit is, of course, designed within the predetermined limits of the transducer 60. Similarly full line pressure applied to the bellows cavity through the low pressure chamber 34 in FIG. 1 would result in nesting of the diaphragm 31 to the partition 20, and a compression of the bellows 40 to accommodate the displaced fluid in the bellows cavity 36 is all within the predetermined limits of the transducer 60.

Figure 2B:
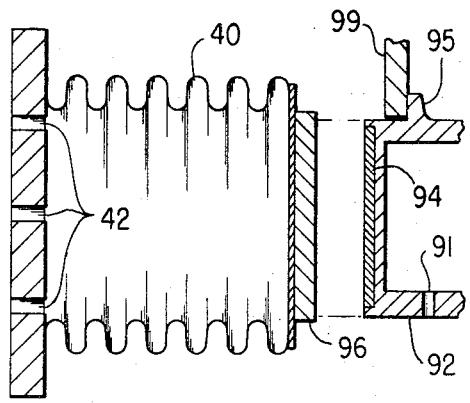
FIG. 2b is a cross-sectional view of the magnetic coupler of FIG. 2a shown de-coupled during overrange pressure.

The embodiment of FIG. 1 was shown to provide a constant volume rigid bellows during a range of pressure differences with the high pressure applied to the bellows cavity 46. FIGS. 2a and 2b show an alternative embodiment where the bellows is maintained rigid in situations where the high pressure is applied to the outside of the bellows or the bellows chamber 36.

An external magnet retainer 92, having a passage 91 to the transducer, has a magnet 94 and a stop 95. The bellows 40 is maintained in a rigid, constant volume condition by the magnetic coupling between the magnet 94 and a strike plate 96 located on the face of the bellows 40. The retainer 92 is prevented from slipping to allow bellows 40 contraction by the stop 95 interfering with a wall 99. The magnetic coupling is predetermined to hold within the normal range of pressure differentials detected by the transducer 60. Once this range is exceeded by a high pressure appearing outside of the bellows 40, the magnetic coupling is broken and the bellows is free to compress, as shown in FIG. 2b, since it now has only the bellows 40 natural spring coefficient to maintain it rigid. The passage 91 allows fluid to communicate through the retainer 92.

Figure 3:
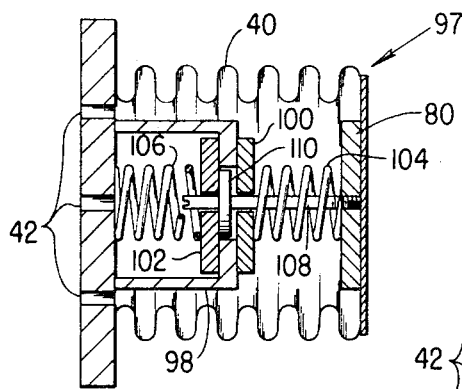
FIG. 3 is a cross-sectional view of yet another magnetic coupler which is bi-directional for preventing expansion and contraction.

The overpressure devices of FIGS. 1 and 2 are intended for use in differential pressure transmitters having specified high pressure and low pressure connections and chambers for proper operation. FIG. 3 depicts an overpressure assembly 97 which does not require high and low pressures to be applied to specific connections and chambers but is adaptable to the transmitter 10 of FIG. 1. The bellows 40 is maintained rigid by a rod 108 having a captive rod head 110 held between an extension magnet 100 and a depression magnet 102, both of which are magnetically coupled to a common strike plate 98. The magnets 100, 102 are located by light springs 104, 106, respectively. The magnetic coupling between magnet 100 and plate 98, as well as magnet 102 and plate 98, are predetermined to hold within the range of pressure differentials measured by the transducer 60. A pressure differential greater than this range will break the magnetic couple in the direction away from the overpressure regardless of which side of the bellows 40 the high or low pressure is applied to. This embodiment utilizes two separate magnets. It would be obvious to obtain the same effect by using a single cylindrical magnet connected to the rod 108 which would magnetically couple with a concentric cylindrical or ring strike plate. This type of coupling also would break in both the direction of bellows 40 extension or retraction.

Figure 4:
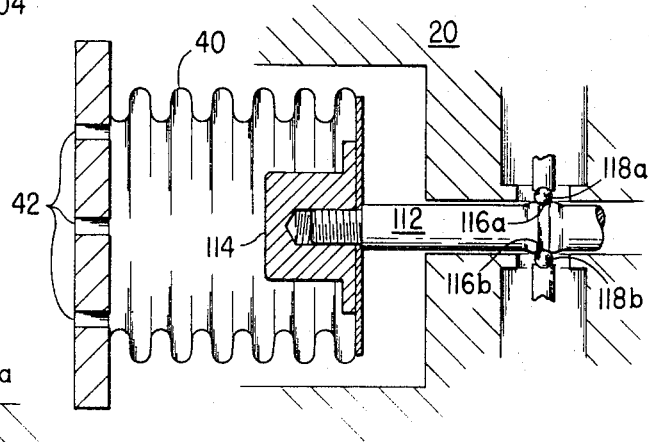
FIG. 4 is a cross-sectional view of a mechanical ball-indent overrange protected bellows.
Figure 4A:
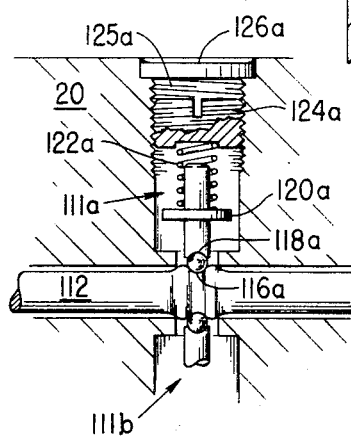
FIG. 4a is an expanded view of the ball-indent arrangement of FIG. 4.

Referring now to FIGS. 4 and 4a, a mechanical ball-indent assembly 111a is utilized for retaining the bellows rigid during the normal measuring range of the transmitter 10. A bellows support rod 112 is coupled to a retainer 114 located on the movable end of the bellows 40. A predetermined distance on the rod 112 is located an indent 116a into which is fitted a spring loaded ball 118a. A retainer 120a has a spring 122a loading it, which spring is made adjustable by an adjustment screw 124a. The described assembly is located in an access chamber 125a which is sealed by a seal plate 126a. It will be understood that the opposite side of shaft 112 has an identical assembly 111b. The spring 122a force is adjusted by turning screw 124a until the assembly is set to allow the ball 118a to slide out of the indent 116a upon application of a differential pressure across the bellows 40 in excess of the transmitter measuring range. Once this setting is accomplished the chamber 125a is sealed by plate 126a and the transmitter is filled with the incompressible fluid as described in reference to FIG. 1.

In normal operation, during normal pressure measurement by the transmitter, the rod 112 is maintained stationary by the balls 118 being locked in the indents 116. Since the rod 112 is affixed to the bellows 40 by a retainer 114, the bellows 40 is also maintained stationary.

Whan an overrange pressure condition occurs, the pressure differential across the bellows results in a force which is sufficient to drive the balls 118 out of the indents 116 in the direction of the force produced across the bellows 40. This leaves the bellows 40 free to expand or contract so as to prevent further pressure buildup across itself by a compensating change in bellows 40 volume.

It will be understood that although the ball-indent assembly is located externally of the bellows 40, it could also be located internally. Similarly, this assembly could take the form of a rod with an enlarged head which head would break through an expandable hole during overrange conditions to leave the bellows free to change volume under the overpressure conditions. During normal operations the rod would rest against the hole and the undersized hole would prevent the rod and coupled bellows from exhibiting any motion. This assembly could be made bi-directional by either retaining the rod head between two such undersized holes or using a double headed rod.

Figure 5:
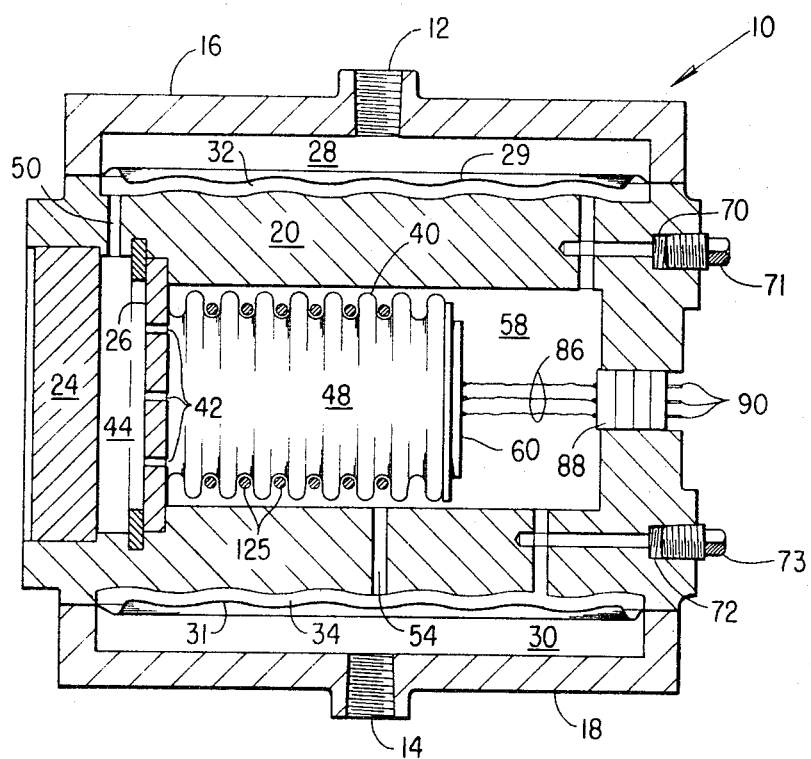
FIG. 5 is a cross-sectional view of the transmitter of FIG. 1 using transfer diaphragm correlated spring bellows overrange protection with the transducer mounted on the bellows.

Referring now to FIG. 5, a transmitter similar to FIG. 1 is shown but wherein the transducer 60 is mounted directly to the face of the bellows 40. Overrange pressure protection is provided by the proper combined choice of spring coefficient for the bellows 40 and the pressure required to completely compress either the chamber 32 or 34. A spring coefficient is predetermined for the bellows 40 which will ensure that the bellows remain substantially rigid and of substantially constant volume under the force of pressure differentials within the range measured by the transducer 60 and deflect for pressure differentials outside the measured range to accommodate the fluid in chambers 32 or 34 without building up pressure magnitudes which would damage the transducer 60. This is accomplished as follows: the deflection caused by an overrange pressure differential near the prescribed limit of the transducer is determined and the volume change of the bellows is calculated from this deflection. The chambers 32 and 34 are then made to contain this volume as a maximum. The required spring coefficient may not be obtainable from the natural spring coefficient of the bellows 40 and so a bias spring 125 can be used. The bias spring 125 could engage either between the convolutions internally or externally of bellows 40.

Obvious modifications will occur to those skilled in the art. It is intended that these embodiments be inclusive of these modifications and not be limited to the devices as explained.

What I claim as new and desire to secure by Letters Patent of the United States is:

1. An overrange pressure limiting device for pressure sensing instruments comprising:
   an easily deflected bellows subjected to the pressure sensed by the instrument;
   a break-away coupler remaining intact and stationary up to a predetermined force level by providing an equal but opposite restoring force beyond which force level said coupler becomes inoperative to exert a restoring force including a magnetically coupled permanent magnet and strike plate enclosed in said bellows; and
   means for joining said break-away coupler to said bellows to render said bellows rigid when said coupler is intact, and render said bellows free to deflect when said coupler is inoperative, said joining means including a rod connecting said bellows to said permanent magnet to prevent said bellows from deflecting while said magnet and strike plate are magnetically coupled, said bellows changing in volume in response to pressure to limit the pressure thereby.

2. An overrange pressure limiting device as set forth in claim 1 wherein said predetermined force level of the break-away coupler is set to occur upon said bellow being subjected to a pressure in excess of range pressure.

3. An overrange pressure limiting device for pressure sensing instruments comprising:
   an easily deflected bellows subjected to the pressure sensed by the instrument;
   a break-away coupler including a mechanically coupled ball and indent and remaining intact and stationary up to a predetermined force level by providing an equal but opposite restoring force beyond which force level said coupler becomes inoperative to exert a restoring force; and
   means for joining said break-away coupler to said bellows including a rod having said indent and connecting said bellows to said ball and indent coupling to prevent said bellows from deflecting while said ball is retained in said indent, to render said bellows rigid when said coupler is intact, and render said bellows free to deflect when said coupler is inoperative, said bellows changing in volume in response to pressure to limit the pressure thereby.

4. An overrange pressure limiting device as set forth in claim 3 including means for spring loading said ball to retain it in said indent and prevent said rod from moving thereby.

5. An overrange pressure limiting device as set forth in claim 4 wherein said spring loading means includes means for adjusting the force on said ball by deflecting the spring of said spring loading means thereby changing the predetermined force at which said break-away coupler becomes disengaged from said bellows.

6. An overrange pressure limiting device as set forth in claim 5 wherein said spring loading means is adjusted to render said break-away coupler disengaged when said bellows is subjected to a pressure greater than range pressure.

* * * * *